July 28, 1953    J. F. GRIFFITH ET AL    2,647,103
LATEX COAGULATION PROCESS
Filed Nov. 3, 1950
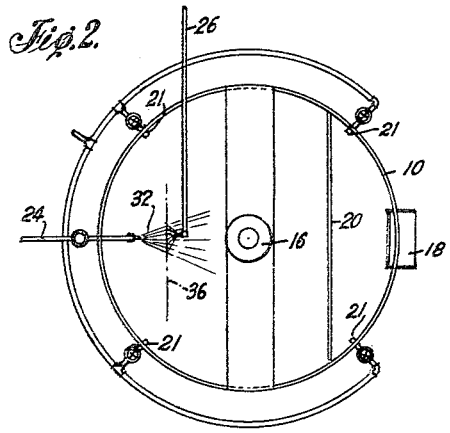
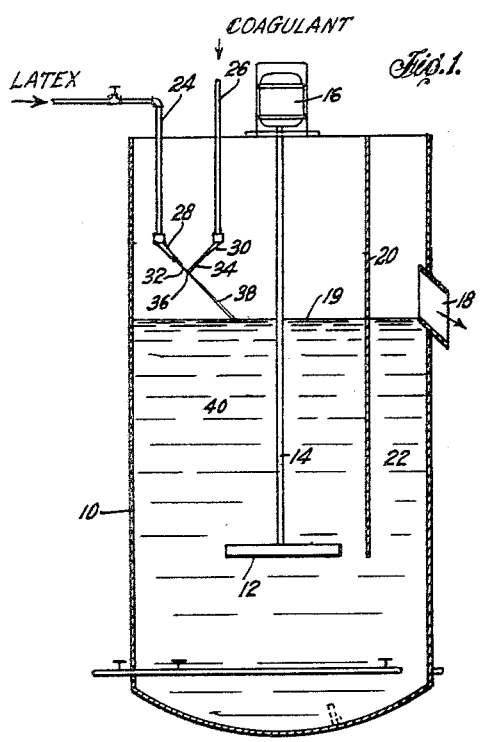
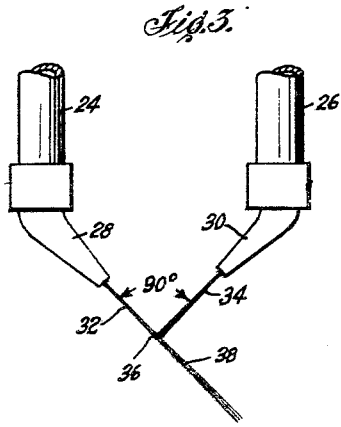
INVENTORS
JOHN F. GRIFFITH
ROBERT W. LANGE
AND
THOMAS W. FISHER, JR.
BY
ATTORNEYS Patented July 28, 1953

2,647,103

UNITED STATES PATENT OFFICE 2,647,103

LATEX COAGULATION PROCESS

John F. Griffith, Pottstown, Robert W. Lange, Boyertown, and Thomas W. Fisher, Jr., Elverson, Pa., assignors to The Firestone Tire & Rubber Company, Akron, Ohio, a corporation of Ohio Application November 3, 1950, Serial No. 193,966

4 Claims. (Cl. 260—63)

This invention relates to a novel process for the coagulation of vinyl chloride resin latices, and to an apparatus for carrying out said process.

In one conventional process for the manufacture of vinyl chloride resins, the monomeric vinyl chloride is emulsified in an aqueous medium and there polymerized, yielding a stable colloidal dispersion of the polymer which, by analogy to natural rubber dispersions, is designated a latex. This latex is treated with a suitable electrolyte, whereby the resin is precipitated in the form of a granular powder, which is separated from the resultant slurry by filtration, and dried. Such granular products commonly contain a certain amount of large hard glazed particles resulting from agglomeration of the resin as it is precipitated from the latex, which particles show up as "fish eyes" (i. e., optical and mechanical discontinuities) in films and other sheeted products made from the resins. Apparently these large, hard glazed particles do not blend with the plasticizers and pigments to the same degree as do the normal resin granules, and carry over into film, artificial leather or like products made therefrom as lumpy areas which have not fully accepted the deformation imposed by the calender, and which have optical properties differing from the main body of the resin. These discontinuities are the "fish eyes" referred to.

Accordingly, it is an object of this invention to provide a novel process and apparatus for coagulating vinyl chloride latices.

Another object is to provide such a process which yields granular vinyl chloride resin products which are of uniform texture and which are free from the objectionable large, hard particles hereinbefore referred to.

Another object is to provide such a process which may be carried out in a continuous manner.

A further object is to provide a novel apparatus for carrying out the process of this invention.

SYNOPSIS OF THE INVENTION

The above and other objects are secured, in accordance with this invention, in a process and apparatus whereby a fan-shaped sheet or jet of an aqueous solution of a coagulating electrolyte is impinged upon a fan-shaped sheet or jet of latex at a point above the surface of a body of a heated aqueous slurry of previously coagulated resin. The jets, after their impingement, drop into said body of slurry, and the latex becomes coagulated so as to form additional quantities of slurry. Coagulated slurry is continuously drawn off from the body of slurry, and dewatered to recover the granulated resin. The coagulating solution and latex, before they drop into the slurry are preferably but not necessarily relatively cool, i. e., lower than 110° F. The body of slurry, however, is maintained at a relatively high temperature by injection of steam or other suitable means, the temperature being on the order of from 120° to 212° F. preferably about 200° to 205° F. The body of slurry is vigorously agitated so as to remove the material freshly introduced from the jets as rapidly as possible from the vicinity of the jets, and to blend this freshly introduced material as rapidly as possible with the general body of the slurry.

THE VINYL CHLORIDE LATICES

The term "latex" is employed in this specification, as in the synthetic polymer industry generally, to denote stable colloidal dispersions, in aqueous media, of polymer or copolymer particles (in the present instance particles of vinyl chloride polymer or copolymer) having average diameters ranging from 0.01 to 1.0 micron. In any given latex, the diameters of the individual particles are of course distributed on either side of this average diameter, some being larger and some smaller in accordance with typical distribution curves. However, in no case do more than 1% of the particles in any suitable latex have diameters greater than 1.5 microns. These particles are present in the latices to the extent of from about 20% to about 60%, based on the weight of the latices. Such latices are produced by emulsifying in water the liquid monomeric vinyl chloride (or mixtures thereof with a comonomer as described hereinbelow) in the presence of a micelle-forming ionic-type emulsifying agent and a water-soluble free-radical generating catalyst. The monomeric constituents diffuse from the emulsified droplets in which they are originally found to the (very much smaller) emulsifier micelles, and polymerize therein to form polymer particle nuclei. These nuclei imbibe further quantities of the monomeric constituents, which polymerize therein to form ultimate resinous polymer particles having diameters in the range cited. These particles form stable colloidal dispersions, in the aqueous media, generally resembling natural hevea rubber latex, and the term "latex" has accordingly been extended in the industry to include stable colloidal dispersions of vinyl chloride polymers and copolymers as described.

Suitable water-soluble free-radical-generating catalysts which may be used in the production of latices for use in this invention include, for instance, hydrogen peroxide, di-t-butyl peroxide, t-butyl hydroperoxide, peracetic acid, and ammonium and alkali metal salts of the inorganic peracids such as ammonium persulfate, sodium persulfate, potassium persulfate, potassium perborate, sodium percarbonate and the like. The use of these water-soluble catalysts is absolutely essential to the production of suitable latices for use in this invention. They will ordinarily be employed to the extent of from 0.02 to 1.0%, based on the weight of the monomers in the reaction charge.

Referring to the micelle-forming emulsifying agents employed in the manufacture of latices, these in general are compounds containing (1) a hydrocarbon group having from about 8 to about 22 carbon atoms and (2) a solubilizing ionizing group such as an ammonium or alkali metal carboxylate group, an ammonium or alkali metal sulfate ester group, an ammonium or alkali metal sulfonate group, analogous phosphate and phosphate groups, or an acidified primary, secondary, tertiary or quaternary amine group. Examples of suitable emulsifying agents are the fatty soaps such as sodium laurate, potassium stearate, ammonium oleate, sodium salts of abietic acid and its derivatives such as sodium salts of rosin and hydrogenated, dehydrogenated and disproportionated rosin; alkali metal and ammonium hydrocarbon sulfonates such as sodium naphthalene sulfonate, nuclearly alkylated sodium benzene sulfonates and naphthalene sulfonates, sodium sulfosuccinate, and the sodium salts of the products produced by the reaction of paraffins with sulfuryl chloride under ultraviolet light; alkali metal and ammonium sulfate half-esters such as sodium lauryl sulfate, the sodium salts of the sulfate half-esters of the alcohols produced by reduction of cocoanut or other natural oil fatty acids, Turkey red oil and the like; and amine salts such as lauryl amine hydrochloride or stearylamine hydrochloride. In the cases where persulfate catalysts are employed, such as ammonium, sodium, potassium or lithium persulfate, the catalyst reacts with the monomeric constituents to produce in situ organic sulfates and sulfonates of the general class set forth above so as to supply a portion, and in some cases all, of the necessary micelle-forming emulsifying agent. Generally, the emulsifying agent, from whatever source derived, shall be present to the extent of from 0.05 to 2.0%, based on the weight of the aqueous emulsifying medium.

The resinous particles in the latices coagulated in accordance with this invention may consist of polymers of unmixed vinyl chloride, or copolymers of vinyl chloride having the essential vinyl chloride polymer chain interspersed at intervals with the residues of other unsaturated compounds copolymerizable therewith. In general, the essential character of the vinyl chloride polymer chains will be retained provided that not more than 20%, based on the weight of copolymers, of other unsaturated compounds are copolymerized therein; conversely stated, the copolymer must contain at least 80% of vinyl chloride copolymerized therein. The compounds which may be copolymerized with vinyl chloride are in general quite well-known and include ethylenically monounsaturated or conjugated di-unsaturated compounds. Examples of suitable copolymerizable compounds are vinyl esters on the order of vinyl bromide, vinyl fluoride, vinyl acetate, vinyl chloroacetate, vinyl butyrate, other fatty acid vinyl esters, vinyl alkyl sulfonates and the like; vinyl ethers such as vinyl ethyl ether, vinyl isopropyl ether, vinyl chloroethyl ether and the like; cyclic unsaturated compounds such as styrene, the mono- and polychloro-styrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate, and the like; vinylidene compounds on the order of vinylidene chloride, vinylidene bromide, vinylidene fluorochloride, and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, piperylene, divinyl ketone and the like. For a fairly complete list of materials known to polymerize with vinyl chloride, reference may be had to Krczil "Kurzes Handbuch Der Polymerisations—Technik—II Mehrstoff Polymerization" Edwards Bros. Inc. 1945 pp. 735–747, the items under "Vinyl chlorid." As a rough rule, the criterion of a practical comonomer for use with vinyl chloride to produce copolymers containing from 20% or more of vinyl chloride is that, on a mole percentage basis, an initial charge of 96% vinyl chloride, balance comonomer, shall yield an initial copolymer containing (a) at least 90% vinyl chloride, and (b) not more than 99% vinyl chloride. On this basis, satisfactory comonomers for use with vinyl chloride will be those having "$Q_2$" and "$e_2$" values, as described in J. Polymer Science 2:101, correlated as follows, assuming for vinyl chloride $$Q_{\text{vinyl chloride}}=.03, \text{ and } e_{\text{vinyl chloride}}=.3:$$

$$4.1 > \frac{.029 e^{-.3(.3-e_2)}}{Q_2} + .04 \over 1.33 Q_2 e^{e_2(.3-e_2)} + .96 > .37$$

Instead of the single unsaturated comonomers of the types above indicated, mixtures of such comonomers may enter into the copolymers, it being understood that the total quantity thereof shall be small enough (i. e., not over 20%, based on the weight of the copolymer), that the essential character of the polyvinyl chloride chain is retained.

Any of the conventional coagulating agents for vinyl resins may be employed in the process of this invention. Suitable coagulants will thus be seen to include soluble polyvalent metal salts, calcium chloride, calcium nitrate, magnesium chloride, aluminum sulfate, alum, lead nitrate, lead acetate and the like; acids such as hydrochloric acid, sulfuric acid, and mixtures thereof with salts such as sodium chloride and the like. It is to be understood of course, that combinations of the foregoing coagulating agents may be employed.

OPERATION OF THE COAGULATION PROCESS

The impingement of the streams of latex and of coagulant is effected by flowing the respective liquids through nozzles so directed that the projected streams impinge at a point removed from the orifices of both nozzles, so as to avoid coagulation of the resin upon either of the nozzles. Both nozzles are preferably designed to project fan-shaped sheets of liquid in a generally downwardly inclined direction. Preferably the two nozzles are placed approximately at the same height above the body of slurry, and are directed azimuthally towards each other and downwardly at about 45° from the horizontal. Also preferably, the nozzles are sufficiently close to the point of impingement of the two streams that each of the streams at that point still retains its character of a continuous fan-shaped sheet of fluid, rather than being broken up into droplets; at the same time, the nozzles should be sufficiently far from the impingement point that the spatter from the impact will not fly up and foul the nozzles. Generally speaking, the nozzles should be from about six inches to about 15 inches distant from each other and from the point of impingement. The distance from the point of impingement to the surface of the body of slurry is, of course immaterial, although design considerations will generally require that the point of impingement be from one inch to six feet above the surface of the slurry. The latex and coagulant as supplied should be rather cool, preferably at temperatures from 40° F. to 110° F., as less trouble will be experienced from corrosion and premature coagulation of the latex at these cooler temperatures and somewhat better performance is obtained; however, higher temperatures, even up to 212° F. may be employed.

The body of the coagulated slurry, as noted above, is maintained at relatively high temperatures, from 120° to 212° F., and is vigorously agitated. The degree of agitation should be such that the freshly introduced coagulant and semi-coagulated latex dropping from the point of impingement of the jets should be at least 50% assimilated into the body of the slurry within one second after its entry into the slurry, under the general principles for measurement of agitation proposed by Wood et al., Chemical and Metallurgical Engineering 27:1176. As applied in the present instance, the concentration of material which - has - entered - within - the - last - second (hereinafter referred to as "freshly-introduced latex," although it will of course be largely coagulated and indistinguishable from the rest of the slurry) at any point in the slurry may be calculated from (a) the temperature of the slurry at that point, (b) the temperature of the latex and coagulant as they are supplied, and (c) the general temperature of the coagulated slurry taken at a point so remote from the entry of the latex as to be unaffected thereby. Thus, if the temperature of the latex supplied is 80° F.; the temperature of the general body of the slurry is 200° F.; and the temperature of the slurry at the point under consideration is 140° F.; it is obvious, assuming equal specific heats for latex and slurry, that the slurry at that point contains 50% of freshly introduced latex. If the slurry at that point is colder than 140° F. it obviously contains more than 50% of the freshly introduced latex and vice versa if the slurry is hotter than 140° F., it contains more than 50% of freshly introduced latex. The time, since its entry from the jets, of the freshly introduced latex at any point may be estimated from the distance of that point (along the flow lines of the slurry) from the point of entry of the latex to that point and the average component of velocity of the slurry along these flow lines. Thus, if the velocity of the slurry is 2 feet per second, it may be assumed that at any point two feet away along the flow lines of the slurry from the point of entry of the latex, the freshly introduced latex has dwelt in the body of the slurry for at least one second. The test requirements for agitation may therefore be summed up, that the temperature of the slurry, at any point beyond a distance from the entry of the latex of one second's travel at the velocity of the slurry, must at all times be closer to the temperature of the general body of the slurry than to the temperature of the latex supplied.

The slurry should be permitted to digest for a certain period of time before being discharged from the apparatus for filtration. Generally, precautions should be taken to insure that all material shall have a residence time, in the slurry mass, of at least one-half minute. If the process is operated continuously, therefore, it will be desirable to withdraw the slurry from the mass through a channel which is maintained largely quiescent and which has sufficient length and cross-section to insure the desired residence time.

Subsequent to the digestion, the slurry is dewatered and washed with water on a centrifuge or other suitable apparatus. The resultant granular material is then dried to yield a powdered resinous product which, in contrast to resins produced by other processes, is of even grain size and is free from large agglomerates which would cause "fish-eyes" and other discontinuities in products made therefrom.

AN APPARATUS SUITABLE FOR USE IN THIS INVENTION

A suitable apparatus is shown in the accompanying drawing in which:

Fig. 1 is a vertical section through an apparatus suitable for use in this invention.

Fig. 2 is a top view of the apparatus of Fig. 1.

Fig. 3 is a detail view showing the nozzles in the apparatus of Fig. 1.

Referring to the drawing, the apparatus shown comprises a vertical cylindrical tank 10 provided with a revolving stirrer impeller 12 secured to the lower end of a vertical shaft 14 driven by a motor 16 mounted on the tank. The tank is provided with an overflow spout 18 which establishes the height of the liquid level 19 in the tank, and with a baffle 20 extending from a point above the overflow 18 to a point substantially on the same level as the impeller 12, and defining, with a portion of the wall of the tank 10, a channel 22 through which the contents of the tank must flow in order to pass out through the overflow spout 18. Steam inlets 21 are provided around the bottom periphery of the tank in order to heat the contents thereof.

The latex to be coagulated, and the coagulant solution, are supplied to the apparatus respectively through conduits 24 and 26, which terminate respectively in nozzles 28 and 30 which project generally planar fan-shaped sheets 32 of latex and 34 of coagulant. The two sheets or jets 32 and 34 are projected downwardly at an angle of 45 degrees, and are directed toward each other so as to impinge upon each other at the line 36. The jet 32 is of considerably greater volume, so that it carries on through the point of impingement as indicated at 38, and drops down upon the general body 40 of the liquid contents of the tank. The fanshaped projected spray or sheet 34 of coagulant is wide enough so as to cover the projected sheet 32 of latex at the line 36, and is therefore completely and rapidly intermingled with the later before it drops into the body of slurry 40. The whole body of slurry 40, including the surface level 19 thereof, is subjected to vigorous agitation by the impeller 12, so that the freshly supplied latex and coagulant 38 is quickly seized and blended with the main mass of the slurry. As above noted, the conditions of agitation are such that this newly added material is at least 50% assimilated into the main mass of slurry within one second after it enters the mass.

Immediately upon impingement with the stream of coagulant 34 at the line 36, the latex begins to coagulate, which coagulation continues and is completed during the residence of the latex in the equipment. The continuous addition of latex and coagulant at 28 and 30 causes the contents of the tank 10 to overflow continuously at the spout 18. In order to avoid short circuiting of the latex direct to the overflow 18, and to insure a residence time of the material supplied adequate to secure complete coagulation of the latex, the baffle 20 provides a channel 22 shielded from the impeller 12 through which the slurry must pass in a more or less quiescent state before being discharged at the spout 18.

EXEMPLARY OPERATION OF THE PROCESS OF THIS INVENTION

Preparation of latex

A latex was prepared in accordance with the following recipe, in which all parts given are by weight.

| | |
|---|---|
| Vinyl chloride | 100 parts |
| Water | 180 parts |
| Sodium stearate | .5 part |
| Sodium persulfate | 1 part |
| Sodium hydroxide | q. s. for pH of 10.5 in charge |

A pressure vessel provided with a stirrer, and means for heating and cooling the contents, together with automatic temperature controls was employed in the preparation. The listed reactants were introduced into the vessel at 60° F., and stirring commenced, which stirring was continued throughout the subsequent polymerization. The vessel was closed and the temperature was then raised to 104–108° F., being kept within this range by the automatic controls until the reaction was over. At the end of 16 hours after the beginning of the reaction, the polymerization appeared to have slowed up practically to cessation. The unpolymerized vinyl chloride was then vented from the vessel, and the reaction mass was then transferred to a stripping vessel in which the remaining unreacted monomer was purged, and thereafter cooled to 25° C. The resultant product was a true latex containing 30% by weight of a vinyl chloride polymer, dispersed therein.

The coagulation

The apparatus shown in the drawings and described above was used in this step. The specific dimensions of the apparatus were as follows: height of tank 10, 8 feet; diameter of tank, 4 feet, 6 inches: height of overflow 18 above bottom of tank, 5 feet, 3 inches: diameter of impeller 12, 25 inches: height of impeller and bottom of the baffle 20 above the bottom of the tank 10, 2 feet 6 inches. The nozzles 28 and 30 were 9 inches apart and one foot above the liquid level 19. The impeller 12 operated at 135 revolutions per minute. At the start of the operation, the tank 10 was filled with pure water at 205° F., but during operation a steady state was soon achieved in which the tank was filled with a slurry formed from the previously coagulated latex.

Under the steady state of operation, latex at 25° C. was fed at the rate of 10 gallons per minute through the pipe 24 into the nozzle 28 from which it was projected as a fan-shaped planar sheet or jet with an included angle between its edges of about 130 degrees. The jet was directed downwardly at an angle of about 45 degrees, and maintained its integrity as a solid sheet about one-sixteenth inch thick (rather than breaking up into droplets) for a distance of at least 10 inches from the nozzle 28. A 6% aqueous coagulant solution of calcium chloride was supplied at the rate of one gallon per minute through the pipe 26, and was projected by the nozzle 30 as a planar fan-shaped jet 34 which intersected the jet 32 along the line 36, which it instantly intermingled with the latex. The mingled latex and coagulant continued on as a jet 38 which fell upon the surface 19 of the body of slurry 40.

The body of slurry was kept at a temperature of about 205° by injection of steam through the steam jets 21, and was vigorously agitated by the stirrer 12. The intermingling of the material introduced by the jet 38 with the main body of the slurry was almost instantaneous, as evidenced by the impossiblity of detecting any lowering of temperature of the body of the slurry at any point substantially removed from the jet 38.

The coagulant began the coagulation of the latex immediately upon blending with the latex at the line of impingement 36. This coagulation was rapidly completed in the agitated body of the slurry 40, adding to the bulk thereof so that an equal amount of previously coagulated slurry was caused to overflow at 18. The baffle 20 defines with the tank wall a quiescent chamber 22 of volume approximately equal to one minute's throughput of the apparatus, so that all material necessarily remained at the elevated temperature for at least one minute before discharge.

The slurry discharged at 18 was diluted with cold water to bring the temperature down to 175° F., and the cooled slurry was dewatered and washed on centrifugal filters. The product when dried was a powder of even grain size, 98% of which passed a 100 mesh sieve and was free from large glazed agglomerates such as produce fish eyes in finished products fabricated from vinyl resins.

From the foregoing general description and detailed specific example, it will be evident that this invention provides a method for coagulating vinyl chloride resin latices which will produce powdered resinous products of superior properties. The process may be carried out in equipment of inexpensive and simple design, and operates without any difficulties due to caking or agglomeration of the resin in the equipment.

What is claimed is:

1. Process which comprises impinging together, above the surface of a body of a slurry of previously coagulated latex, (1) a freely projected jet in the form of a continuous planar sheet of a latex selected from the group consisting of latices of polymers of vinyl chloride and of copolymers thereof with other unsaturated compounds copolymerizable therewith and containing at least 80% of vinyl chloride copolymerized therein with (2) a freely projected jet in the form of a continuous planar sheet of an aqueous solution of a coagulant for said latex selected from the group consisting of soluble polyvalent metal salts, hydrochloric acid, sulfuric acid and mixtures thereof with sodium chloride, and vigorously agitating said slurry at such a rate as to assimilate the mixture of latex and coagulant dropping thereinto from said jets to the extent of at least 50% within one second of the entry of said mixture into the slurry, said latex and coagulant being supplied at temperatures below 110° F., and said body of slurry being maintained at temperatures from 120° to 212° F.

2. Process which comprises impinging together, above the surface of a body of a slurry of previously coagulated latex, (1) a downwardly directed freely projected jet in the form of a continuous planar sheet of a latex selected from the group consisting of latices of polymers of vinyl chloride and of copolymers thereof with other unsaturated compounds copolymerizable therewith and containing at least 80% of vinyl chloride copolymerized therein with (2) a downwardly directed freely projected jet in the form of a continuous planar sheet of an aqueous solution of a coagulant for said latex selected from the group consisting of soluble polyvalent metal salts, hydrochloric acid, sulfuric acid and mixtures thereof with sodium chloride, and vigorously agitating said slurry at such a rate as to assimilate the mixture of latex and coagulant dropping thereinto from said jets to the extent of at least 50% within one second of the entry of said mixture into the slurry, said latex and coagulant being supplied at temperatures below 110° F., and said body of slurry being maintained at temperatures from 120° to 212° F.

3. Process which comprises impinging together, above the surface of a body of a slurry of previously coagulated latex, (1) a freely projected jet in the form of a continuous planar sheet of a latex selected from the group consisting of latices of polymers of vinyl chloride and of copolymers thereof with other unsaturated compounds copolymerizable therewith and containing at least 80% of vinyl chloride copolymerized therein with (2) a freely projected jet in the form of a continuous planar sheet of an aqueous solution of a coagulant for said latex selected from the group consisting of soluble polyvalent metal salts, hydrochloric acid, sulfuric acid and mixtures thereof with sodium chloride, and vigorously agitating said slurry at such a rate as to assimilate the mixture of latex and coagulant dropping thereinto from said jets to the extent of at least 50% within one second of the entry of said mixture into the slurry, said latex and coagulant being supplied at temperatures below 110° F., and said body of slurry being maintained at temperatures from 200° to 205° F.

4. Process which comprises impinging together, above the surface of a body of a slurry of previously coagulated latex, (1) a downwardly directed freely projected jet in the form of a continuous planar sheet of a latex selected from the group consisting of latices of polymers of vinyl chloride and of copolymers thereof with other unsaturated compounds copolymerizable therewith and containing at least 80% of vinyl chloride copolymerized therein with (2) a downwardly directed freely projected jet in the form of a continuous planar sheet of an aqueous solution of calcium chloride, and vigorously agitating said slurry at such a rate as to assimilate the mixture of latex and coagulant dropping thereinto from said jets to the extent of at least 50% within one second of the entry of said mixture into the slurry, said latex and coagulant being supplied at temperatures below 110° F., and said body of slurry being maintained at temperatures from 120° to 212° F.

JOHN F. GRIFFITH.
ROBERT W. LANGE.
THOMAS W. FISHER, Jr.

References Cited in the file of this patent
UNITED STATES PATENTS

| Number | Name | Date |
|---|---|---|
| 2,366,460 | Semon | Jan. 2, 1945 |
| 2,378,732 | Semon | June 19, 1945 |
| 2,495,147 | Street | Jan. 17, 1950 |